United States Patent
Tang

(10) Patent No.: US 7,688,759 B2
(45) Date of Patent: Mar. 30, 2010

(54) ASYNCHRONOUS DIGITAL SUBSCRIBER LINE (ADSL) RESOURCE PLANNING

(75) Inventor: Harry Tang, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 12/288,292

(22) Filed: Oct. 17, 2008

(65) Prior Publication Data
US 2009/0046722 A1    Feb. 19, 2009

Related U.S. Application Data

(63) Continuation of application No. 09/935,092, filed on Aug. 22, 2001, now Pat. No. 7,440,413, which is a continuation-in-part of application No. 09/749,193, filed on Dec. 27, 2000, now Pat. No. 6,873,628.

(51) Int. Cl.
*H04L 12/28* (2006.01)

(52) U.S. Cl. .................... 370/254; 370/395.1; 370/398

(58) Field of Classification Search .............. None
See application file for complete search history.

(56) References Cited

U.S. PATENT DOCUMENTS

| | | | |
|---|---|---|---|
| 5,613,190 A | 3/1997 | Hylton | |
| 5,627,836 A | 5/1997 | Conoscenti et al. | |
| 6,028,867 A | 2/2000 | Rawson et al. | |
| 6,160,810 A | 12/2000 | Brodigan | |
| 6,198,745 B1 | 3/2001 | Brodigan | |
| 6,404,861 B1 | 6/2002 | Cohen et al. | |
| 6,519,256 B1 * | 2/2003 | Kim | 370/395.1 |
| 6,529,479 B1 * | 3/2003 | Suzuki | 370/236.1 |
| 6,584,074 B1 * | 6/2003 | Vasamsetti et al. | 370/254 |
| 6,597,689 B1 * | 7/2003 | Chiu et al. | 370/354 |
| 6,614,781 B1 | 9/2003 | Cohen et al. | |
| 6,636,505 B1 | 10/2003 | Elliott et al. | |
| 6,870,901 B1 | 3/2005 | Gudmundsson et al. | |
| 6,873,628 B1 | 3/2005 | Tang | |
| 6,885,672 B1 | 4/2005 | Tang et al. | |
| 6,963,916 B1 * | 11/2005 | Pugaczewski et al. | 709/227 |
| 6,978,015 B1 | 12/2005 | Erickson et al. | |
| 7,440,413 B1 | 10/2008 | Tang | |

OTHER PUBLICATIONS

Office communication issued in connection with U.S. Appl. No. 09/749,193, mailed Mar. 26, 2004. (16 pages).
Notice of Allowability issued in connection with U.S. Appl. No. 09/749,193, mailed Sep. 30, 2004. (5 pages).
Office communication issued in connection with U.S. Appl. No. 09/935,092, mailed Jul. 11, 2006. (17 pages).
Notice of Allowability issued in connection with U.S. Appl. No. 09/935,092, mailed Dec. 22, 2006. (6 pages).

* cited by examiner

*Primary Examiner*—Bob A Phunkulh
(74) *Attorney, Agent, or Firm*—Hanley, Flight & Zimmerman, LLC

(57) ABSTRACT

Example methods and apparatus to assign permanent virtual circuits (PVC) to subscribers are disclosed. A disclosed example method to assign a PVC to a subscriber comprises obtaining a parameter representative of a port associated with the subscriber, computing a virtual circuit identifier (VCI) for the PVC from the parameter, and storing the virtual circuit identifier in association with the PVC.

12 Claims, 6 Drawing Sheets

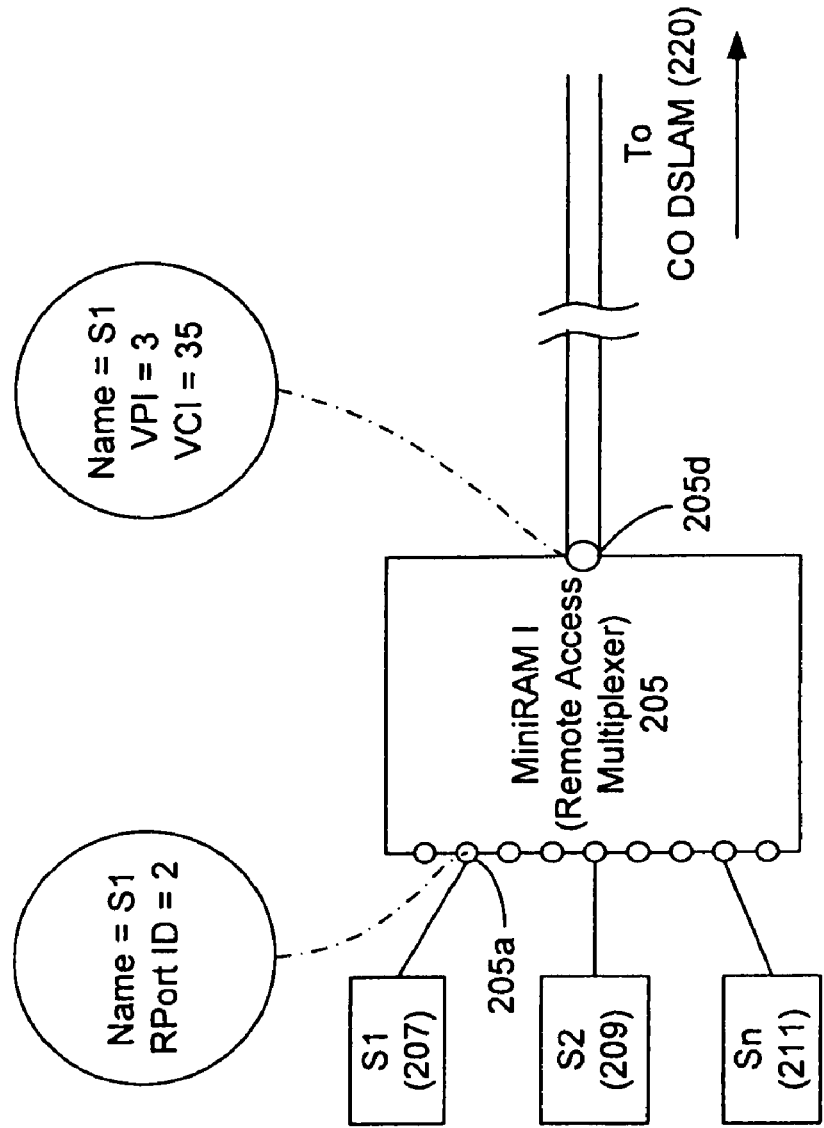

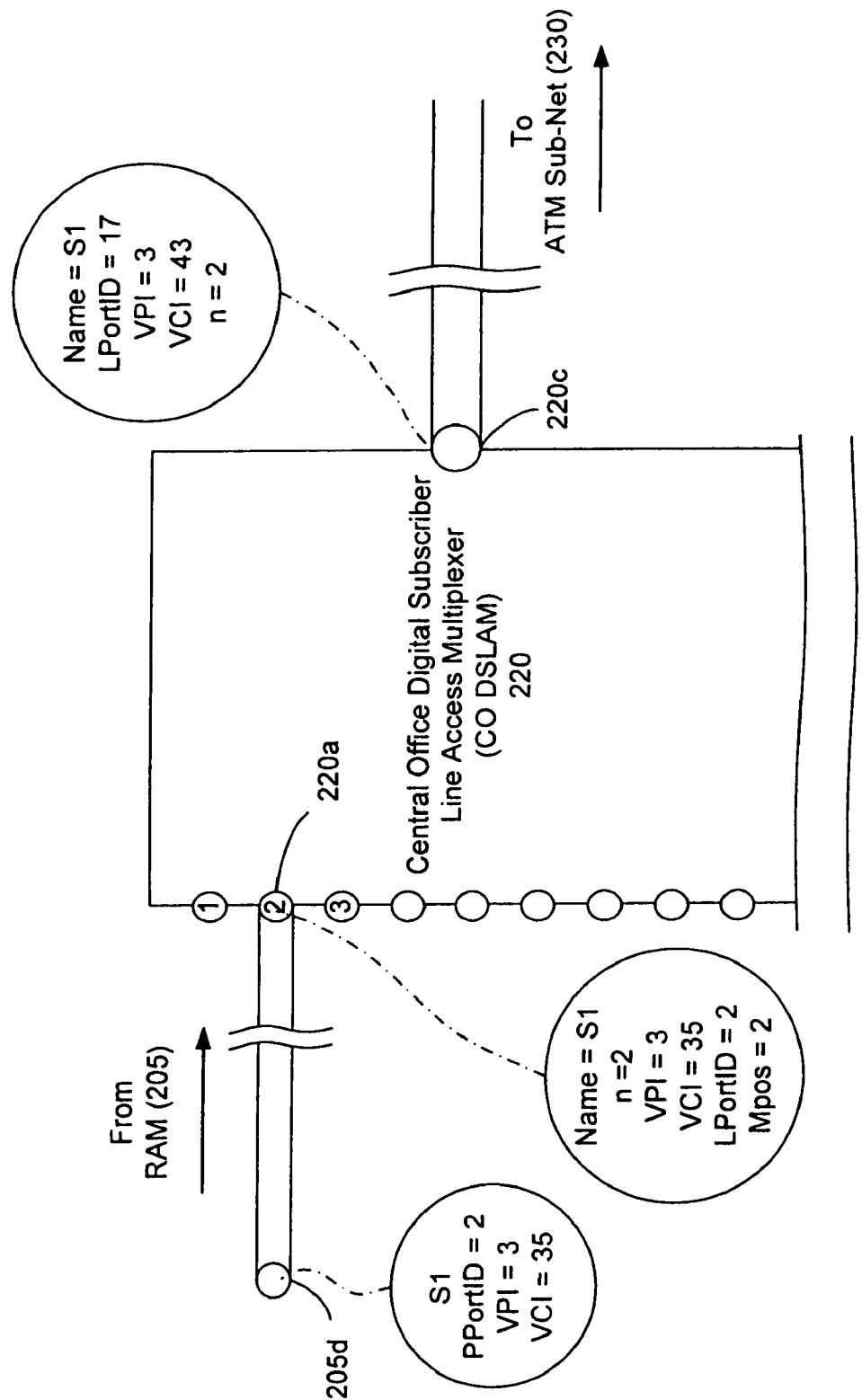

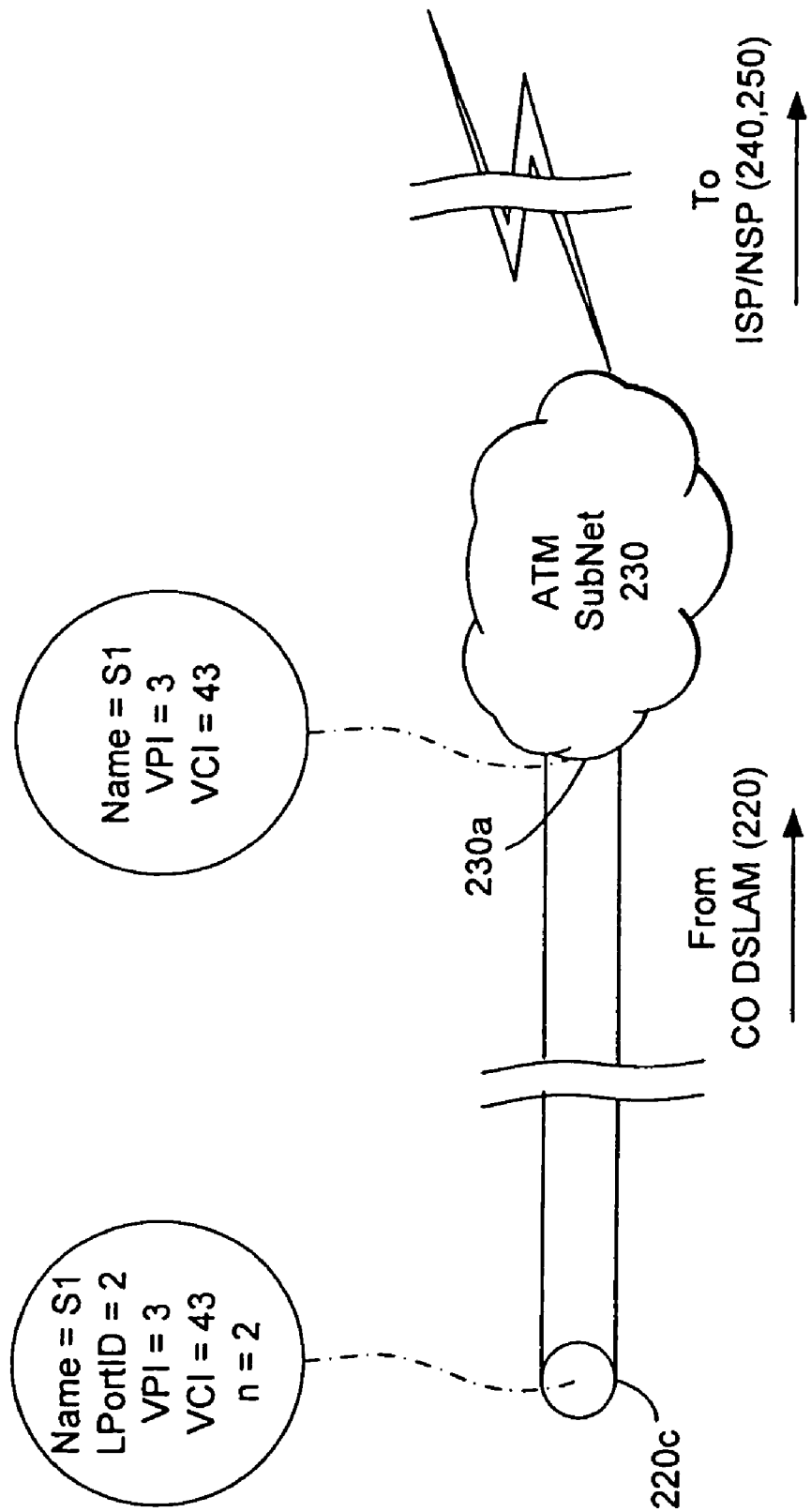

ASYNCHRONOUS DIGITAL SUBSCRIBER LINE (ADSL) RESOURCE PLANNING

RELATED APPLICATIONS

This patent arises from a continuation of U.S. patent application Ser. No. 09/935,092 (now U.S. Pat. No. 7,440,413), which is entitled "Asynchronous Digital Subscriber Line (ADSL) Resource Planning," which was filed on Aug. 22, 2001, and which, in turn, is a continuation-in-part of U.S. application Ser. No. 09/749,193 (now U.S. Pat. No. 6,873,628), which is entitled "Asynchronous Digital Subscriber Line (ADSL) Resource Planning," and which was filed on Dec. 27, 2000. Both U.S. application Ser. Nos. 09/935,092 and 09/749,193 are hereby incorporated by reference in their entirety.

FIELD OF THE DISCLOSURE

The present invention generally relates to the provisioning of resources for a subscriber on an asynchronous digital subscriber line (ADSL) network. Particularly, the present invention relates to optimizing resource provisioning of Central Office (CO) Digital Subscriber Line access multiplexers (DSLAMs) and, more particularly, to providing a system and method to efficiently and reliably manage and optimize resources needed to establish ADSL permanent virtual circuits (PVCs) between subscribers and Internet Service Providers (ISP)/Network Service Providers (NSP).

BACKGROUND

Computing has become an integral component in our daily lives—so much so, that it is nearly impossible to imagine not interfacing with some form of computing device in a given day. The proliferation of computing has helped spawn the development of extremely effective and pervasive communication technologies, such as local area networks, wide area networks, intranets, and the Internet. These communication technologies, much like computing, have become ingrained in our lives, as new industries and markets have sprung into existence to provide services and products using these communication technologies. As more consumers incorporated these communication technologies into their personal or business practices, more service providers have been created to provide the needed communications support. Today, a significant amount of information is being deployed through these communication technologies. The dissemination of the information over these networks is limited by several constraints—chiefly, connectivity, that is, the manner at which information is distributed from a content provider to participating end users. As such, connectivity has become paramount to consumers. Coupled to connectivity, the speed at which the information may be accessed is an important factor that is considered by consumers when choosing a communications service provider.

Service providers have addressed the need for reliable and fast connectivity by developing new protocols that transfer data quickly and efficiently over existing public communication networks. For example, asynchronous transfer mode (ATM) and transmission control protocol/internet protocol (TCP/IP) are two protocols support the efficient transfer of significant amounts of data. Utilizing these protocols, new services, such as digital subscriber line (DSL) and asynchronous digital subscriber line (ADSL) were developed offering participating users fast connectivity rates and integrated services. DSL and ADSL service providers exploit traditional public networks (for example, telephone networks) by creating three distinct channels over a single twisted pair wire connecting a subscriber to the public network. These channels include a transmitting channel to transmit non-voice data, a receiving channel to receive non-voice data, and a voice channel to transmit and receive voice data. A primary benefit of these services is that they are deployed on existing public networks. By using existing public networks, new communications networks and costly equipment are not needed.

Although averting costs and the expenditure of resources by using existing public networks, DSL and ADSL service providers face many challenges in implementing this service on existing public networks. Among these challenges is the provisioning of ADSL network resources for each subscriber. Provisioning is a process that yields an end-to-end permanent virtual circuit (PVC) between the subscriber and the Internet Service Provider (ISP)/Network Service Provider (NSP). Included in the provisioning process is the configuration of various ADSL network hardware to enable the ADSL network to recognize and service participating users. In operation, ADSL network hardware employ various configuration variables when creating PVCs. These configuration variables include the Virtual Path Identifier (VPI) and the Virtual Circuit Identifier (VCI). The VPI and VCI variables are integers that, when used in combination, provide unique identifiers for each PVC and, correspondingly, for each subscriber. Generally, the assignment of values for the VPI and VCI variables is performed randomly by the provisioning process (for example, provisioning software). As such, it is very difficult to arbitrarily determine any VCI value or any VPI value once assigned.

Even with the most advanced provisioning procedures, there exist great inefficiencies. For example, the random generation and assignment of ADSL network configuration variables causes several problems. In the case of a "hung" PVC (that is, the situation where the provisioning system fails during provisioning and it cannot recover the original state leaving a partial connection hanging in the system), already assigned VPI values and VCI values are "locked-out" until they are reset manually. Such scenario results in less than optimal use of available provisioning resources. Alternatively, where the provisioning system cancels the provisioning for a given subscriber in midstream and decides to reinstate the provisioning process for that same subscriber (for example, a situation where a subscriber decides to order ADSL services but changes his/her mind, and then subsequently re-subscribes to ADSL services), the ADSL network operator is left to manually search the logs of the provisioning system to determine which VCI and VPI values were originally assigned to the subscriber. Such process is extremely inefficient and draws upon valuable resources that could otherwise be better utilized.

From the foregoing it is appreciated that there exists a need for systems and methods that provide deterministic configuration variables to better manage and optimize resources of hung provisioning processes. Such a system and method has not been realized in the prior art.

SUMMARY OF THE INVENTION

The present invention provides a system and method to optimize ADSL network resources when provisioning resources on an ADSL network. As part of the provisioning process, configuration variables are set to create a permanent virtual circuit (PVC). The PVC creates an end-to-end connection between participating users and cooperating Internet Service Providers (ISPs) and Network Service Providers (NSPs). The present invention offers systems and methods that provide deterministic configuration variables such that the value of a configuration variable can be easily calculated.

In an illustrative implementation, the provisioning of resources on an ADSL network is performed by a network management system (NMS). The network management system comprises a computing application, which is in communication with the various components of the ADSL network to create, configure, and manage PVCs for participating users. As part of establishing a PVC, the virtual path identifier (VPI) and virtual circuit identifier (VCI) are assigned values that provide a unique VPI/VCI combination that identifies each established PVC. In this implementation, the VPI value may be set by the NMS to a constant value (for example, 0-15) for a group of feasible VCI values and then incremented when the feasible VCI values have been exhausted. That is, the VPI may be set to a constant value of 2 for the feasible VCI values, VCI=33 to 1023) and be incremented by one (for example, VPI=3) when all feasible VCI values have been exhausted. Further, the VCI values may be calculated using a number of other PVC configuration values including, the subscriber connection position on components of the ADSL network (for example, the connection position on the remote access multiplexer (RAM) that physically connects the subscriber to the ADSL network, or alternatively, the connection position on the central office digital subscriber line access multiplexer (CO DSLAM) that connects the RAM to an asynchronous transfer mode (ATM) subnet). The deterministic nature of the VCI variable assists in correcting "hung" provisioning of resource, that is, provisioning processes that are aborted or have failed. In knowing the VPI value and calculating the VCI value, the NMS is better positioned to restart a "hung" provisioning process, that is, complete a partial PVC. As such, ADSL available network resources are optimized.

Other aspects of the present invention are described below.

BRIEF DESCRIPTION OF THE DRAWINGS

The foregoing summary, as well as the following detailed description, of ADSL network resource planning systems and methods in accordance with the present invention are further described with reference to the accompanying drawings. For the purpose of illustrating the invention, like references numerals represent similar parts throughout the several views of the drawings, it being understood, however, that the invention is not limited to the specific methods and instrumentalities disclosed. In the drawings:

FIG. 2A is a block diagram of exemplary subscribers interacting with an exemplary RAM ADSL network component in accordance with the present invention;

FIG. 2B is a block diagram of an exemplary RAM ADSL network component cooperating with an exemplary CO DSLAM ADSL network component in accordance with the present invention;

FIG. 2C is a block diagram of an exemplary CO DSLAM ADSL network component cooperating with an exemplary ATM sub-net in accordance with the present invention.

DETAILED DESCRIPTION

Overview

Figure 1:
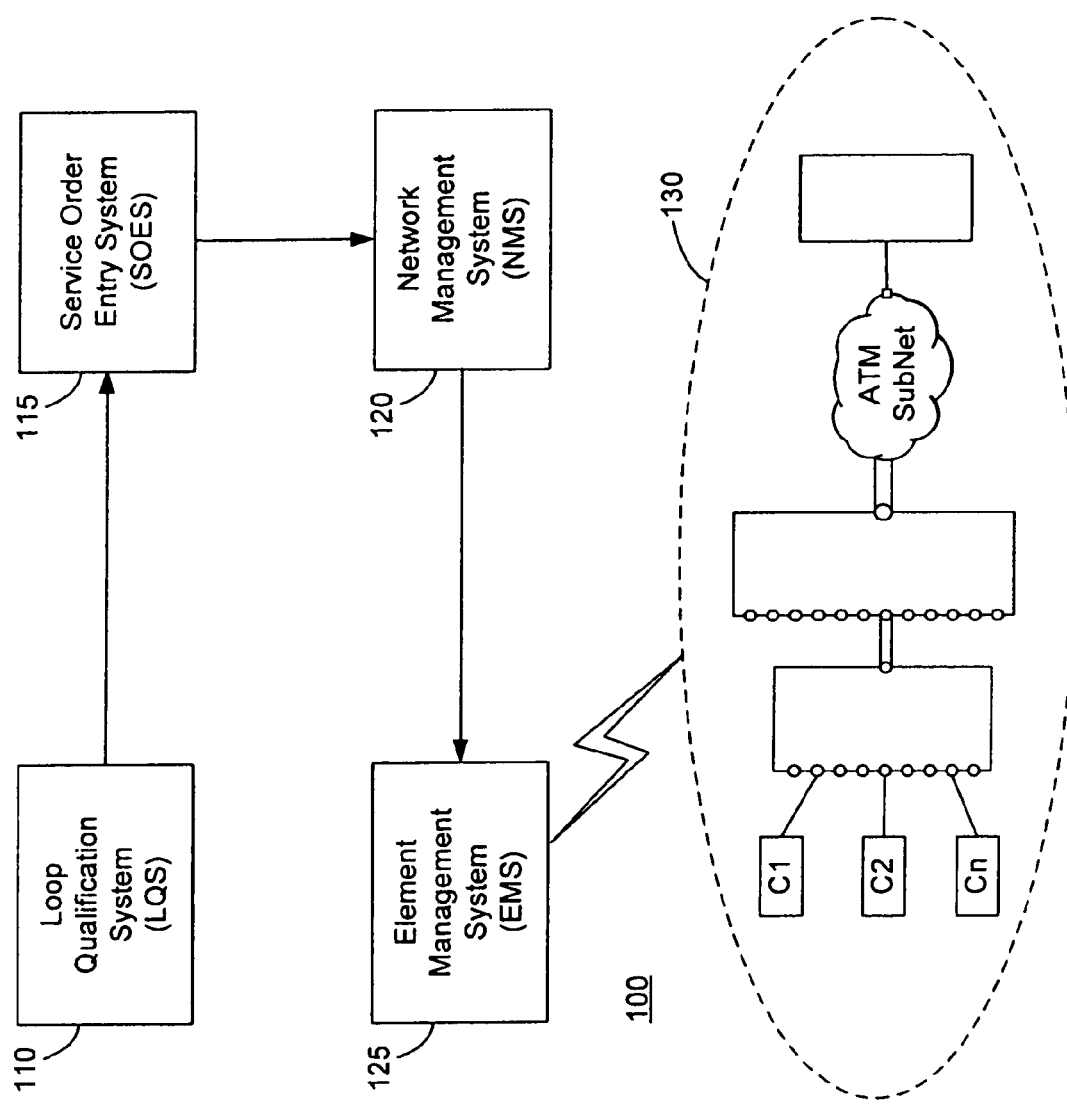
FIG. 1 is a block diagram of an exemplary ADSL network operations and management system in which aspects of the invention may be implemented.

Asynchronous Digital Subscriber Line (ADSL) converts existing twisted-pair telephone lines into access paths for multimedia and high-speed data communications. With ADSL, the throughput of data varies depending on whether the subscriber is receiving or transmitting data from or to a cooperating network service provider (NSP). That is, in conventional ADSL systems, the subscriber can receive up to six megabits per second, and as much as 832 kilobits per second or more in both directions. Such rates expand existing access capacity by a factor of 50 or more without requiring new cabling. ADSL expands existing public information networks from one limited to voice, text and low resolution graphics to a powerful, ubiquitous system capable of supporting various forms of multimedia (for example, streaming audio and video).

Generally, an ADSL circuit connects an ADSL modem on each end of a twisted-telephone line, creating three information channels—a high speed downstream channel, a medium speed duplex channel (depending on the implementation of the ADSL architecture), and a POTS (Plain Old Telephone Service) or an ISDN channel. The POTS/ISDN channel is split off from the digital modem by filters, thus guaranteeing uninterrupted POTS/ISDN, even if ADSL fails. The high-speed channel ranges from 1.5 to 6.1 megabits per second, while duplex rates range from 16 to 832 kilobits per second. Each channel can be sub-multiplexed to form multiple, lower rate channels, depending on the system.

Given that the ADSL technology exploits existing public information networks, the demand for ADSL service is great and it is important to be able to efficiently and reliably provide ADSL to interested subscribers. Realizing that customer satisfaction is tantamount to success, network providers have been driven to develop new processes, hardware, and software to better enhance a potential subscriber's experience when subscribing to the ADSL service. Furthermore, network providers have developed and are developing innovations that facilitate the internal provisioning of ADSL services to potential subscribers. Network providers are striving to reach a point where configuring and using ADSL services is as easy for a user as using today's analog dial-up technologies—if not easier. As such, ADSL service providers have developed automated processes that assist the subscriber in implementing and configuring ADSL equipment to realize ADSL services.

Provisioning of ADSL services for a subscriber entails several steps including the configuration of various ADSL network hardware such that the ADSL network recognizes and services valid subscribers. The ADSL network cooperates with participating ISPs and NSPs over an Asynchronous Transfer Mode (ATM) subnet. As such, certain ATM based configuration variables must be configured during the ADSL services provisioning process. The provisioning of ADSL services yields an end-to-end permanent virtual circuit (PVC) between the subscriber (that is, subscriber's computing device) and the Internet Service Provider (ISPs)/Network Service Provider (NSPs). Such a process requires that the ADSL network and the subscriber's equipment be provisioned in concert. Resources (for example, ADSL network hardware and software) in the carrier's core ATM network connect the user's termination on the digital subscriber line access multiplexers (DSLAMs) to particular service providers. Regardless of whether these resources are permanently configured or are set up on a per-session session basis, each user's service must be configured to associate a given user with the service providers that the user is authorized to access.

A permanent virtual circuit (PVC) is a means by which a user is associated with the correct service provider(s). The PVC comprises a plurality of configuration variables that are configured for each participating subscriber. These variables include the virtual path identifier (VPI) and the Virtual Circuit Identifier (VCI). The VPI is a number between 0-9 that is included in the communication protocol header information and indicates the connectivity path of the subscriber. Likewise, the VCI is a number between 0-1023 that is included in ADSL communication protocol header information and indicates which channel on the ADSL hardware the PVC maintains its connection. The VPI and VCI may be used in combination to uniquely identify each subscriber of the ADSL network. During provisioning, a subscriber is assigned a VPI and VCI combination, which is stored as an entry in a translation table used to associate the VPI/VCI combination to a particular PVC.

As ATM is a connection-oriented transfer mode, the virtual connection between source and destination has to be established before sending packets that carry user data. All packets of an established connection follow the same path within the network. As part of the VPC configuration each network switch generates an entry into the VPI/VCI translation table.

This enables the switch to move an incoming packet from its VPI/VCI to corresponding outgoing VPI/VCI. In operation, when a packet is sent across the network, the VPI/VCI of the originating party is included in the header of the packet. As such, this kind of routing requires a relatively small header: only a locally valid address (that is, VPI/VCI) has to be carried in the packet.

The VPI/VCI designations are a key component of the provisioning process, in that they identify the virtual connection to the subscriber's line. These configuration values are provided and stored by the ADSL network management systems. Traditionally, the VPI/VCI configuration values are assigned non-deterministically—that is, they are assigned independently of the physical connection to the subscriber that the VPI/VCI values represent. Typically, the systems controlling the ADSL network will assign a random VPI value (from the available range of VPI values) and a random VCI value (from the available range of VCI values). This lends to a difficult re-animation process for failed or aborted provisioning procedures. Specifically, since these configuration variables are non-deterministic, the ADSL network operator is left to manually trace through configuration logs to determine the VPI/VCI values for the given failed or aborted provisioning procedure. This is a costly endeavor requiring the expenditure of time and labor. A more beneficial resource planning system would provide deterministic configuration variables that may be automatically calculated by the network management system that controls the allocation of such resources.

The present invention seeks to ameliorate the shortcomings of existing ADSL resource provisioning systems and methods. In an illustrative implementation, the systems and methods of the present invention may be employed as part of an ADSL operations and management system. An exemplary ADSL operations and management system comprises a Look Qualification System (LQS), a Service Order Entry System (SOES), a Network Management System (NMS) and an Element Management System (EMS). The LQS is used to determine if the ADSL network can deliver ADSL services to the participating user (that is, interested subscriber). If qualified, the SOES procures and stores service information for the participating user. A portion of the collected service information is passed to the NMS to begin the provisioning of resources for the participating subscriber. The NMS uses service information to communicate with the ADSL network through the EMS. The EMS communicates with the ADSL network components through common communication protocols to set configuration variables and establish PVCs as per NMS instructions.

In operation, the network management system communicates with ADSL network components to provision resources such to connect an interested subscriber participating user) seeking ADSL services to an ADSL network providing such services. The process begins by physically connecting the subscriber to a remote accessing multiplexer (RAM). In some examples, the RAM is housed and maintained at an ADSL network node local to the participating user. The NMS provides the RAM instructions for configuration of the first leg of the ADSL PVC. In addition, the NMS tracks and stores the configuration information for this first leg. Included in the configuration process of the first leg is the assignment of configuration variables for subscriber. For example, the PORTID configuration variable may be set. The PORTID configuration variable communicates to the NMS, the rack, shelf, card-slot, and port values that the participating subscriber has been given on the accepting RAM.

The NMS communicates with the RAM to calculate and assign the VPI and VCI values to create the VPI/VCI unique combination for the PVC being created. The NMS employs various algorithms to calculate these values. Moreover, if needed (for example, in the case of hung provisioning processes), these algorithms may be used by the NMS to re-calculate the VPI and VCI values. Further, the NMS communicates with the central office digital subscriber line access multiplexer (CO DSLAM) to set and ascertain additional configuration variables, such as, the ADSL port position on the CO DSLAM (Dpos). Lastly, the NMS communicates with the ATM sub-network to which the CO DSLAM is connected to ascertain the ATM network port-id. Using all of these configuration variables, the NMS can provision these ADSL network components (that is, resources on these ADSL network components) to create PVCs.

As will be described below with respect to FIGS. 1-3, the present invention is directed to systems and methods to optimize resource planning for ADSL services. In accordance with an illustrative implementation thereof, the present invention comprises a system and method to provide ADSL network operators with an enhanced network management system application that will employ deterministic configuration variables that drastically reduce the amount of resources required to re-animate the failed or aborted provisioning resources for ADSL services.

In one embodiment, described more fully hereinafter, the system and method of the present invention may be implemented as part of a network management system of an ADSL network that cooperates with ADSL network components to provision resources for ADSL services. Although the depicted embodiment contemplates a network management system application employing specific algorithms to produce deterministic configuration variables, those skilled in the art will appreciate that the inventive concepts described herein extend to various computing application processes that produce deterministic variables that may be used in the configuration of ADSL services on an ADSL network.

Illustrative ADSL Network Operations and Management Systems

FIG. 1 shows a block diagram of an illustrative ADSL network operations and management system 100. ADSL network operations and management system 100 comprises Loop Qualification System (LQS) 110, Service Order Entry System (SOES) 115, Network Management System (NMS) 120, and Element Management System (EMS) 125. As shown, LQS 110 cooperates with SOES 115. In turn, SOES 115 cooperates with NMS 120, and NMS 120 cooperates with EMS 125. EMS 125 cooperates with ADSL Network 130 to communicate information from LQS 110, SOES 115, and NMS 120. In operation, LQS 110 checks the feasibility (that is, qualification) of interested subscribers' network connection and passes this information to SOES 115. For example, LQS 110 may verify that the location of the interested subscriber is within the geographic scope for the offered ADSL services. Upon qualification, SOES 115 procures service information about interested subscribers. The service information is passed to NMS 120 to begin the provisioning of resources for the interested subscriber. NMS 120 communicates with ADSL network 130 through EMS 125 to communicate instructions for the configuration of PVCs that establish an end-to-end connection between the subscriber and ISPs/NSPs. NMS 120 creates, tracks, stores, and manages the PVCs for ADSL subscribers. In this capacity, NMS 120 can implement changes to PVC configuration.

Illustrative ADSL Network

Figure 2:
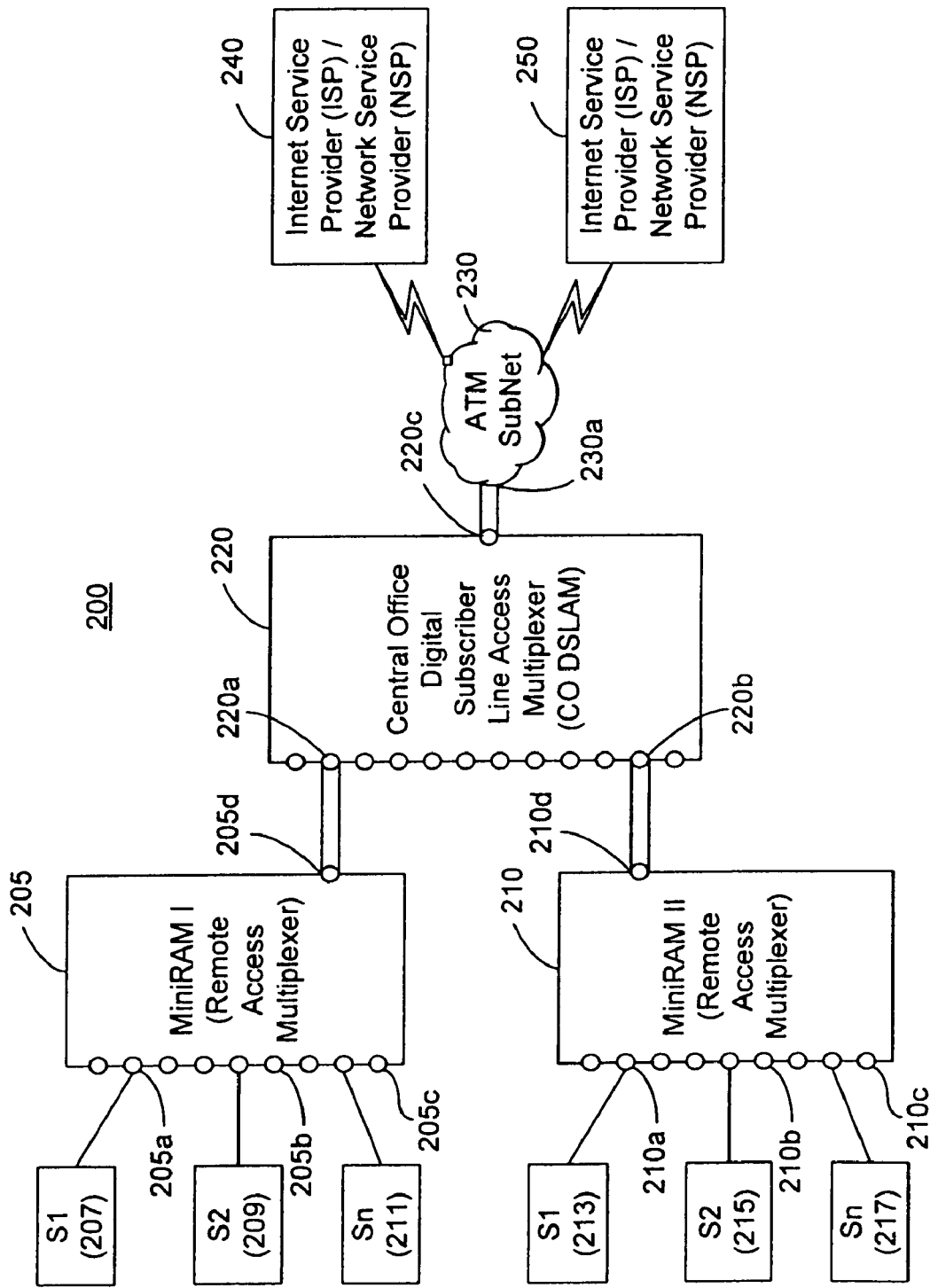
FIG. 2 is a block diagram of an exemplary ADSL network in accordance with the present invention.

FIG. 2 shows a block diagram of illustrative ADSL network 200. ADSL network 200 comprises a plurality of subscribers (207, 209, 211, 213, 215, 217) electronically coupled to a plurality of remote access multiplexers (RAMs) (205, 210) using ports 205*a*, 205*b*, 205*c*, 210*a*, 210*b*, and 210*c*, of RAMs 205 and 210, respectively. Further, ADSL network 200 comprises a central office digital subscriber line access multiplexer (CO DSLAM 220) that accepts RAM outputs 205*d* and 210*d* at its input 220*a* and 220*b*, respectively. CO DSLAM 220 is coupled at its output 220*c* to an asynchronous transfer mode (ATM) subnet 230 at input 230*a* of ATM sub-net. Further, the ATM sub-net 230 is coupled to Internet Service Providers (ISPs)/Network Service Providers (NSPs) (240 and 250). As shown, a plurality of subscribers are connected to RAMs 205 and 210. RAMs 205 and 210 have a plurality of ports to accept ADSL data from subscribers. It should be appreciated that although RAMs 205 and 210 are shown as accepting three subscribers, RAMs 205 and 210 are typically capable of accepting more than three subscribers. RAMs 205 and 210 act to route data to and from the plurality of subscribers to CO DSLAM 220, which in turn route data to ATM subnet 230 that communicates the subscriber data to ISPs/NSPs 240 and 250.

In order for these ADSL network components to communicate data to and from subscribers, these ADSL network components require configuration. The configuration of ADSL network components allow ADSL network components to properly route the data to and from the appropriate subscribers to and from cooperating ISPs/NSPs. That is, as a plurality of subscribers simultaneously provide and request data from cooperating ISPs/NSPs, streams of data pass through these ADSL network components. These ADSL network components require configuration to identify which subscriber or ISP/NSP particular data packets are to be routed to. Accordingly, permanent virtual circuits (PVCs) are created for each subscriber along the ADSL network components. The PVCs are utilized to properly route the data travelling over the ADSL network between subscribers and cooperating ISPs/NSPs.

Provisioning of ADSL Resources (Creation of Permanent Virtual Circuits)

In operation, the NMS 120 of FIG. 1, cooperates with SOES 115 and EMS 125 to provision resources for subscribers on the ADSL network to create permanent virtual circuits (PVC) between subscribers and cooperating ISPs/NSPs. A PVC allows data to be correctly routed between subscribers and ISPs/NSPs over the ADSL network. The proper communication between ADSL network components is ensured through the creation and assignment of configuration values among the ADSL network components for each subscriber. For example, exemplary ADSL network 200 comprises a RAM, a CO DSLAM, and ATM sub-net. The RAM must be able to communicate data packets received from subscribers to the CO DSLAM in such a manner that the CO DSLAM can route those packets correctly. Similarly, the CO DSLAM must communicate the received packets in such a manner that the ATM sub-net can route those packets to the appropriate ISPs/NSPs. That is, if subscriber S1 (reference numeral 207) uses ISP/NSP 240, packets originating from subscriber S1 must contain sufficient identifying information that they can be routed to ISP/NSP 240 rather than ISP/NSP 250. As such, the NMS 120 knowing the configuration schemes of these ADSL network components assigns and tracks configuration variables on these ADSL network components such that data can be properly routed. Each of the ADSL network components keeps track of the set configuration variables such that received data can be properly processed and communicated to other cooperating ADSL network components.

FIGS. 2A-2C illustrate the configuration of the various ADSL network values to create a permanent virtual circuit (PVC) for subscribers on an exemplary ADSL network. FIG. 2A shows the provisioning of resources for subscriber S1 (207) on RAM 205 of exemplary ADSL network 200 (of FIG. 2). In operation, NMS 120 (shown in FIG. 1) communicates with RAM 205 to set RAM configuration and ADSL network configuration variables for S1 (207). As shown, at RAM port 205*a*, S1 has the RAM input configuration variables Name=S1 and RportID=2. "RportID" refers to the RAM input port to which a subscriber is assigned. At the output 205*d* of RAM 205, S1 has the following values, Name=S1, RportID=2, VPI=3, and VCI=110. NMS 120 provides RAM 205 the VPI and VCI values for S1. These values may be calculated according to the processing shown in FIG. 3.

FIG. 2B shows the provisioning of resources on CO DSLAM 220 of exemplary ADSL network 200 (of FIG. 2) for subscriber 1. As shown, output 205*d* of RAM 205 acts as input 220*a* to CO DSLAM 220. Stated differently, the values of the configuration variables 220*a* are the same as those configuration variables found at output 205*d*. The values of the configuration variables at input 220*a* of CO DSLAM are as follows: Name=S1, VPI=3, VCI=10, and n=2. The VPI and VCI values are communicated from RAM 205 to CO DSLAM 220 for use in the creation of a PVC for S1. The value Rport represents the position of ADSL port for S1 on the miniRAM 205. Since the PVC for S1 provisions a cross-connection between CO DSLAM connection points 220*a* and 22*c*, respectively, the configuration variables at 220 are know, and the configuration variables at 220*c* have yet to be determined. In the contemplated illustrative implementation, the VPI/VCI configuration variables are calculated in accordance with at least one deterministic algorithm. The deterministic algorithm employs various variables to calculate the configuration variables. For example the ADSL network variable LPortID is employed. LPortID defines the unique position of the line-side port of the CO DSLAM used to generate the PVC (that is, the port that is closer to exemplary subscriber, S1). In the contemplated illustrative implementation, the LPortID generally maintains a value in the range between 1 and 576, or more. In operation, the LPortID ports are ADSLports that are connected to subscribers directly. Further, LPortID ports generally have large bandwidths (for example, TI and/or DSL type-bandwidth, ~1.5 Megabits/second). The port positions are made unique by associating the port numbers other configuration variable. For example, rack, shelf, card, and port ADSL network configuration values may be employed.

Another variable employed by the contemplated deterministic algorithm is the configuration variable called sequence number, n. The sequence number, n, may be considered the timing order number for the MiniRAM components defining the order in which the ports of the MiniRAM connect to the CO DSLAM (for example, the first MiniRAM connected to the CO DSLAM may have a value of n=1, the second miniRAM would may have a value of n=2, and so on). In operation, the value of LPortID and sequence number, n, are stored in a data structure as an attribute of the CO DSLAM. This data structure is then employed by the deterministic algorithm when processing the necessary ADSL network provisioning values. In the example shown in FIGS. 2-2C, assuming that MiniRam 210 is the first MiniRAM that is connected to CO DSLAM 220, and that MiniRAM 205 is the second RAM connected to CO DSLAM 220. Accordingly, the sequence number, n, for MiniRAM 205 is n=2, and for MiniRAM 210 is n=1. Using these values, the contemplated deterministic algorithm is capable of calculating the needed ADSL network provisioning values VPI and VCI. In the example provided, the contemplated deterministic algorithm calculates a VPI value of 3, and a VCI value of 3 using the configuration variable values described above.

FIG. 2C illustrates the completion of a PVC for subscriber S1 that requires a cross-connection established on ATM subnet 230. Since the VPI and VCI physical link values for S1 are static, the VPI and VCI values at location 230a are the same as those at location 220c at S1 (that is, Name=S1, VPI=3, VCI=43). Correspondingly, at the other end of the ATM subnetwork (that is, the end of the ATM sub-network that connects to the ISP and/or NSP), the VPI and VCI values will be different from those values found at location 230a. In operation, the VPI and VCI values at the ISP/NSP side are generally pre-determined by the ISP/NSP through service order generation. Accordingly, in the illustrative implementation, subscriber S1 is now afforded a connection to cooperating ISP/NSP over the established PVC using the calculated VPI/V CI values.

It should be observed that randomly choosing VPI and VCI values for participating subscribers at the CO DSLAM 220c results in the possibility that different participating subscribers be assigned the same VPI and VCI values, as different MiniRAMs may be connected to the CO DSLAM. Further, if the failed provision operation does not rectify the failed connected on the CO DSLAM at first, the failed provisioning will be corrected in subsequent operations. Specifically, the contemplated deterministic algorithm calculates new random VPI and VCI values in each failed provision operation. If the values conflict the operation repeats.

Figure 3:
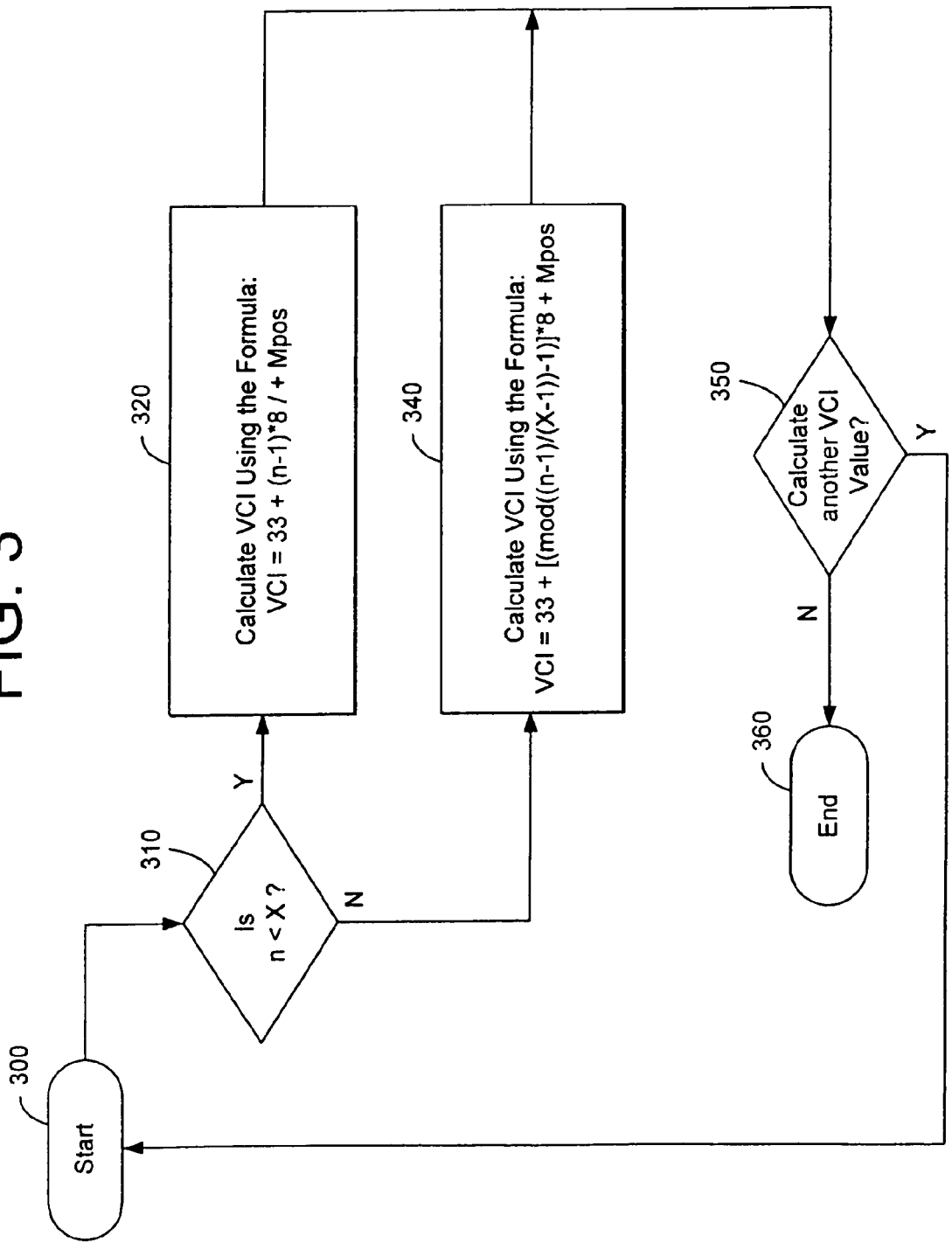
FIG. 3 is flow diagram of the processing performed by the resource planning system to provide deterministic configuration variables in accordance with the present invention.

FIG. 3 shows an exemplary process performed by the NMS 120 of the illustrative ADSL network operations and management system 100 of FIG. 1 to calculate the deterministic configuration variables VPI and VCI at CO DSLAM 220c in accordance with the present invention. Processing begins at block 300 and proceeds to block 310 where a check is performed to determine if the sequence number (n) is less than a pre-defined number X. The pre-defined number X reflects the physical limitations of the cooperating ADSL components. In one example, an ADSL network may comprise a CO DSLAM that is capable of representing VCI values as 10-bit integers (0-1023), and values 0-32 may be reserved for system use. In this case, 991 VCI values (the number of integers between 33 and 1023, inclusive) are available for assignment as VCI values for subscriber PVCs. Moreover, the exemplary ADSL network comprises RAM network components each having eight input ports. Generally, MiniRAMs are designed to have a multiple of eight ports (for example, 8, 16, 48, 98, etc.). In the event that a cooperating MiniRAM does not maintain the eight multiple port convention, the ADSL ports may be divided into groups of eight. For, each group of eight ports, a single sequence number is assigned. As a result, a single MiniRAM may reserve more than one consecutive sequence number if it has more than eight ADSL ports. Under these parameters, the pre-defined number X is 123 (that is, 991 subscribers divided by 8). As will be seen below, X represents the condition that the VCI numbers must be recycled for different VPI values (as seen below), after 123 8-port RAMs are connected to the DSLAM, because 8 input ports multiplied by 124 RAMs is greater than 991, and thus there would be insufficient numbers in the range 33-1023 to handle a 124th 8-port RAM. Generally, as described above, VPI values are determined in combination with VCI values to provide a unique VPI/VCI value combination. VPI values may range from 0-15 or 0-255 depending on the manner of use of the VPI value by the exemplary ADSL network. In the illustrative implementation described, VPI has a start value of 3. The start value can be any non-zero value in the described range. Once the VCI range of values has been completely exhausted for a certain VPI value, the VPI value is incremented by one to create a unique VPI/VCI value combination.

However, if the sequence number is less than the pre-defined number X, processing proceeds to block 320 where the VPI and VCI values are calculated using the equations:

$$VCI = 33 + (n-1)*8 + Mpos$$

where:
n=CO DSLAM Sequence Number
Mpos=ADSL Port Position on Contributing RAM (In the event that the cooperating MiniRAM has more than 8 ADSL ports, Mpos, represents the relative position the ADSL port.)

$$VPI = 3 + INT(n/X)$$

where:
X=a pre-defined ADSL network physical parameter used to distinguish competing ADSL networks.

Processing then proceeds to block 350 and therefrom.

In an illustrative implementation, VPI is assigned a start value of 3 and the network ADSL physical parameter X is assigned a value of 123. Using these values, a unique VPI value may be calculated using the above formula. The VPI equation will be used to calculate the new and unique VPI equation when the VCI cycle is exhausted for a particular VPI value. Generally, the VPI resource is far less easy to consume compared to VCI resources during conventional ADSL network provisioning operations. For example, each VPI resource may be combined with 984 VCI values. As a result, 3 or 4 VPI values are all that are necessary to accommodate a number of MiniRAMs connected to single CO DSLAM (for example, 4 VPI values may accommodate 4000 provisioning operations for 4000 cooperating subscribers on a single CO DSLAM.) As mentioned, the Mpos value is used to calculate the new unique VPI value. Mpos is the relative ADSL network position on a MiniRAM for MiniRAMs having eight ports. It is the true port position. If the MiniRAM has more than eight ports, the remaining ports may be segregated into a remaining group. In each group of 8, Mpos serves to indicate the relative position of the port in that group. As a result, Mpos usually maintains a value in the range of 1-8. In addition to the Mpos value, the above equations also employ the sequence number, n. The sequence number n is the time-order number for a MiniRAM connected to the CO DSLAM. For a MiniRAM having more than eight ports, it may contain several consecutive numbers. For example, if the MiniRAM supports 24 ADSL ports, it has 3 groups of 8 ports. As a result, the exemplary MiniRAM may maintain 3 consecutive sequence numbers. If the first sequence number happens (as a result of the MiniRAM position relative to the CO DSLAM) to be 5, then the other two sequence numbers for the exemplary MiniRAM are 6 and 7. Namely, sequence number 5 corresponds t the port group 1-8, sequence number 6 corresponds to the port group 9-16, and sequence number 7 corresponds to port group 17-24.

With this convention, the data structure (LPortID, n) describes important attributes of the CO DSLAM. For example, if a new subscriber order enters the above-described NMS system and the NMS performs the provisioning process employing the above-described equations. In operation, using the LPortID value, the NMS attempts to find the positions (LPortID, n) on the cooperating CO DSLAM. This process may return several elements having various values of (LPortID, n) that have the same LPortID but different sequence numbers. As explained, the plurality of sequence numbers results from one or more cooperating MiniRAMs having more than 8 ports. Once several elements are found, the NMS will use absolute port positions on the MiniRAM to determine which ADSL port group (of 8 ports each) it belongs to. From the group number, the appropriate sequence number may be found among the multiple (LPortID, n) combinations. Further, the Mpos value can be calculated according to its relative position in the group. Once the value combination (n, Mpos) are determined or calculated, the deterministic algorithm described above can be used to calculate VPI/VCI values.

It will be observed that block 320 assigns VCI values to each subscriber according to the particular RAM to which the subscriber is connected, and also according to the subscriber's position on that RAM. This algorithm prevents collisions between VCI values for subscribers on different RAMs (up to 123 RAMs), because each RAM has its own run of eight (or relative eight) VCI values. For example, a first RAM connected to the CO DSLAM on port sequence number 1 can use VCI values 33-40 (that is, 33+0*8=33; where Mpos can have values from 1-8, the VCI values for that first RAM can range from 33+1 (=34) through 33+8 (=41)). Similarly, a second RAM connected on CO DSLAM port number 2 can use VCI values 41-48 (that is, 33+1*8=41) where Mpos can have values from 1-8, the VCI values for that second RAM can range from 41+1(=42) through 41+8 (=49)).

Returning now to block 310, if it is determined that n is not less than X, processing proceeds to block 340 where the VPIO and VCI values are calculated using the following formula:

$$VPI=3+INT(n/X)$$

$$VCI=33+[mod((n-1)/(X-1))-1]*8+Mpos$$

where:
n=Sequence Number for the MiniRAM connected to the CO DSLAM
X=Pre-defined ADSL Network Physical Parameter
Mpos=ADSL Port Position on Contributing RAM.

It will be observed that block 340 implements the "recycling" of VCI values. As noted in the example above, if there are only 991 available VCI values, then it is not possible to assign a unique VCI value to subscribers connected to RAMs in excess of 123 (that is, for a 124th RAM, the calculation would be 33+(124−1)*8+Mpos). 33+(124−1)*8=1017, which means that, according to the formula of block 320, the eight VCI values for a 124th RAM would range from 1017 through 1024, and 1024 is an unacceptable value given the physical parameters of the system. Thus, the solution is to use the remainder when n is divided by X. This essentially causes VCI values to be reused when the number of RAMs exceeds X. When VCI values are recycled, the VPI value must be changed in order to ensure that a unique VPI/VCI combination is assigned to each subscriber. For example, after the 123rd RAM, the VPI value could be incremented by one, so that recycling of VCI values does not cause collisions among subscribers in the combined VPI/VCI value.

Following either block 320 or 340, processing then proceeds to block 350 where a check is performed to determine whether another VCI value requires calculation. If there are no more VCI values than require calculation, processing terminates at block 360. However, if the alternative proves to be true, processing reverts to block 300 and proceeds therefrom.

It should be observed that the algorithm described in FIG. 3 yields at least two distinct advantages: First, it deterministically assigns a VPI/VCI value to each subscriber connected to a particular DSLAM (thereby allowing the VPI/VCI value to be recalculated easily for a given subscriber in the case of a "hung" PVC). Second, it prevents two subscribers on the same DSLAM from having the same VPI/VCI value. The algorithm shown in FIG. 3 is a preferred method of accomplishing these goals, but it will be appreciated that other algorithms can be used to meet these goals in the assignment of VPI/VCI values. Such other algorithms may be substituted for that shown in FIG. 3 without departing from the spirit and scope of the invention.

In sum, the present invention provides a system and process to optimize resource planning for ADSL services, allowing ADSL network operators the ability to exploit available resources on an ADSL network. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (for example, ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method to assign a permanent virtual circuit (PVC) to a subscriber, the method comprising:
    obtaining a parameter representative of a port associated with the subscriber;
    computing a virtual circuit identifier (VCI) for the PVC from the parameter;
    storing the virtual circuit identifier in association with the PVC; and
    when the port comprises a remote access multiplexer (RAM) port associated with a RAM to which a device associated with the subscriber is communicatively coupled, computing the VCI for the PVC by:
    subtracting one from the parameter to form a first value;
    computing a product of the first value and a number of ports of the RAM to; and
    adding the product, a second value and an offset to form the VCI, the second value representing a port of a digital subscriber line access multiplexer to which the RAM is communicatively coupled.

2. A method as defined in claim 1, wherein the port comprises at least one of a port of a remote access multiplexer (RAM) via which a device associated with the subscriber is communicatively coupled to the RAM, or a digital subscriber line access multiplexer (DSLAM) port via which the subscriber is communicatively coupled to the DSLAM.

3. A method as defined in claim 1, further comprising configuring a remote access multiplexer and a digital subscriber line access multiplexer to implement the PVC for the subscriber.

4. A method to assign a permanent virtual circuit (PVC) to a subscriber, the method comprising:
    obtaining a parameter representative of a port associated with the subscriber;
    computing, with a processor, a virtual circuit identifier (VCI) for the PVC from the parameter;
    storing the virtual circuit identifier in association with the PVC; and
    when the port comprises a digital subscriber line access multiplexer port to which a remote access multiplexer (RAM) is communicatively coupled, computing the VCI for the PVC by:
    subtracting one from a first value to form a second value, the first value representing a second port of the RAM to which a device associated with the subscriber is communicatively coupled;
    computing a product of the second value and a number of ports of the RAM; and
    adding the product, the parameter and an offset to form the VCI, wherein.

5. A method to assign a permanent virtual circuit (PVC) to a subscriber, the method comprising:
    obtaining a parameter representative of a port associated with the subscriber;
    computing, with a processor, a virtual circuit identifier (VCI) for the PVC from the parameter;
    storing the virtual circuit identifier in association with the PVC; and
    when the port comprises a remote access multiplexer (RAM) port associated with a RAM to which a device associated with the subscriber is communicatively coupled, computing the VCI for the PVC by:
    subtracting one from the parameter to form a first value;
    computing a remainder of a division of the first value and a second value, the second value being selected to avoid duplicate assignment of VCI values;
    subtracting one from the remainder to form a third value,
    computing a product of the third value and a number of ports of the RAM; and
    adding the product, a fourth value and an offset to form the VCI, the fourth value representing a port of a digital subscriber line access multiplexer to which the RAM is communicatively coupled.

6. A system to assign a permanent virtual circuit (PVC) to a subscriber, the system comprising:
    a digital subscriber line access multiplexer (DSLAM);
    a remote access multiplexer (RAM) communicatively coupled to the DSLAM via a first port of the DSLAM; and
    a network management system (NMS) to compute a virtual circuit identifier (VCI) for assignment to the PVC, the NMS to compute the VCI based on a first identifier associated with the first port and a second identifier associated with a second port of the RAM with which the subscriber is associated, wherein the NMS is to compute the VCI by:
    subtracting a constant from the first identifier to form a first value;
    computing a product of the first value and a number of ports of the RAM; and
    adding the product, the second identifier and an offset to form the VCI.

7. A system as defined in claim 6, further comprising an element management system to configure the RAM and the DSLAM to implement the PVC for the subscriber.

8. A system to assign a permanent virtual circuit (PVC) to a subscriber, the system comprising:
    a digital subscriber line access multiplexer (DSLAM);
    a remote access multiplexer (RAM) communicatively coupled to the DSLAM via a first port of the DSLAM; and
    a network management system (NMS) to compute a virtual circuit identifier (VCI) for assignment to the PVC, the NMS to compute the VCI based on a first identifier associated with the first port and a second identifier associated with a second port of the RAM with which the subscriber is associated, wherein the NMS is to compute the VCI by:
    comparing the first identifier to a threshold; and
    when the first identifier is greater than the threshold:
    subtracting a constant from the first identifier to form a first value;

subtracting one from the threshold to form a second value;

computing a remainder of a division of the first and second values;

subtracting one from the remainder to form a third value, computing a product of the third value and a number of ports implemented by the RAM; and adding the product, the second identifier and an offset to form the VCI.

9. A tangible article of manufacture storing machine readable instructions that, when executed, cause a machine to assign a permanent virtual circuit (PVC) to a subscriber by:

obtaining a parameter representative of a port associated with the subscriber;

computing a virtual circuit identifier (VCI) for the PVC from the parameter;

storing the virtual circuit identifier in association with the PVC; and when the port comprises a remote access multiplexer (RAM) port associated with a RAM to which a device associated with the subscriber is communicatively coupled, computing the VCI for the PVC by:

subtracting one from the parameter to form a first value;

computing a product of the first value and a number of ports of the RAM to; and adding the product, a second value and an offset to form the VCI, the second value representing a port of a digital subscriber line access multiplexer to which the RAM is communicatively coupled.

10. A tangible article of manufacture as defined in claim 9, wherein the port comprises at least one of a port of a remote access multiplexer (RAM) via which a device associated with the subscriber is communicatively coupled to the RAM, or a digital subscriber line access multiplexer (DSLAM) port via which the subscriber is communicatively coupled to the DSLAM.

11. A tangible article of manufacture as defined in claim 9, wherein the machine readable instructions, when executed, cause the machine to configure a remote access multiplexer and a digital subscriber line access multiplexer to implement the PVC for the subscriber.

12. A tangible article of manufacture storing machine readable instructions that, when executed, cause a machine to assign a permanent virtual circuit (PVC) to a subscriber by:

obtaining a parameter representative of a port associated with the subscriber;

computing a virtual circuit identifier (VCI) for the PVC from the parameter;

storing the virtual circuit identifier in association with the PVC; and when the port comprises a digital subscriber line access multiplexer port to which a remote access multiplexer (RAM) is communicatively coupled, computing the VCI for the PVC by:

subtracting one from a first value to form a second value, the first value representing a second port of the RAM to which a device associated with the subscriber is communicatively coupled;

computing a product of the second value and a number of ports of the RAM; and adding the product, the parameter and an offset to form the VCI, wherein.

* * * * *